June 2, 1942. H. T. WHEELER 2,285,319
POLY-SEGMENTAL PACKING RING
Filed April 7, 1939
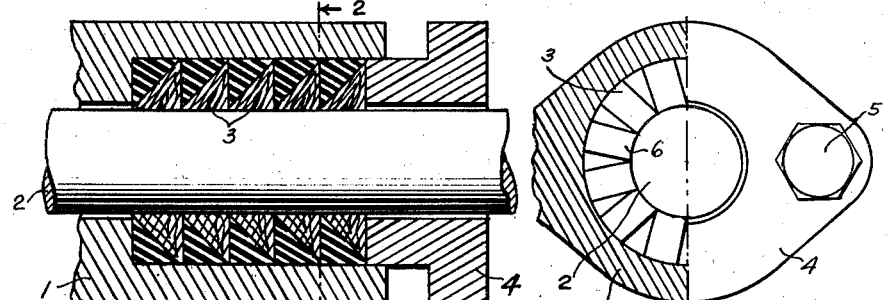
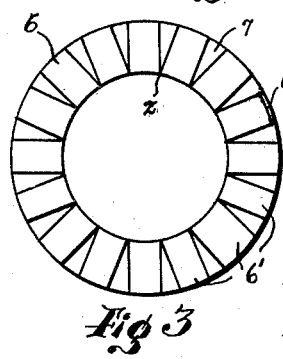
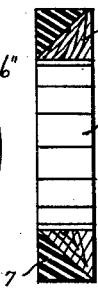
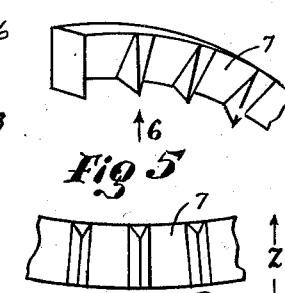
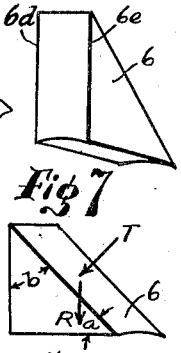
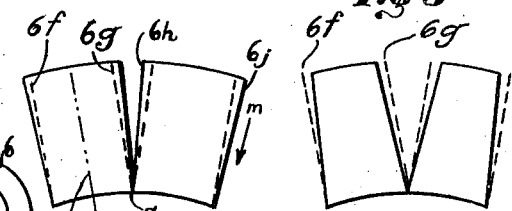
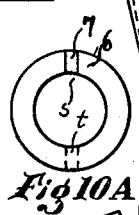
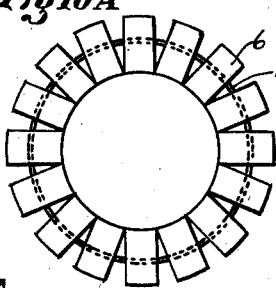
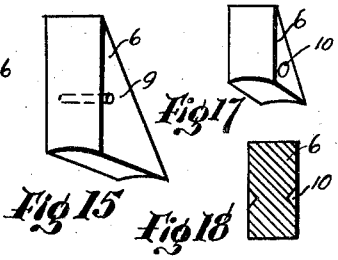
Harley T. Wheeler
INVENTOR.
Jesse R. Stone
and
Lester B Clark
BY ATTORNEY.

Patented June 2, 1942

2,285,319

UNITED STATES PATENT OFFICE 2,285,319

POLYSEGMENTAL PACKING RING

Harley T. Wheeler, Dallas, Tex.

Application April 7, 1939, Serial No. 266,565

2 Claims. (Cl. 288—7)

This invention relates to packing rings and similar devices useful for sealing pressure, comprised of a multiplicity of segments, joined together in a flexible manner, and its chief advantage is that the construction utilizes many desirable materials not possible in other forms of packing.

Another advantage is that materials such as wood and compositions which warp in the presence of fluids and temperature, may be used in this construction.

Still another advantage is that material such as rock, glass, and porcelain may be used to resist corrosive chemical action of fluids.

One advantage is the extreme flexibility of this ring assembly, using the before mentioned materials for sealing surfaces, so that vibration of the moving parts does not affect the sealing efficiency.

Yet another advantage is that this design makes possible a choice of materials which may be used on temperatures above 1000 degrees Fahrenheit.

An important advantage is that after installation in a stuffing-box, none of the sealing segments can be dislodged by pressure or friction until the packing ring is worn out.

A very important advantage is that as wear of the sealing elements occurs, take-up by the stuffing-box gland does not alter the original relative positions of the parts.

The foregoing advantages are further explained in the specification to follow, accompanied by the drawing, wherein:

Figure 1 is a cross-sectional view of a conventional stuffing-box equipped with packing rings of this invention.

Figure 2 is an end view in partial cross section of box of Figure 1, along line 2 of Figure 1.

Figure 3 is an end view of the poly-segmental packing ring.

Figure 4 is a cross-sectional view of a polysegmental packing ring made according to this invention.

Figure 5 is a perspective view of the flexible element which houses the sealing segments.

Figure 6 is a plan view along line 6 of Figure 5.

Figure 7 is a perspective of a sealing segment, or shoe.

Figure 8 is a diagrammatic plan of the wearing surfaces of a shoe, or segment, pressure and dimensional data.

Figure 9 is a cross section of several rings assembled as in a stuffing box.

Figure 10 is a partial cross-section showing sealing segments after wear has taken place at the rod surface.

Figure 10A shows how a packing member may be formed into a single or a double segmental ring.

Figure 11 shows sealing segments with non-parallel sides.

Figure 12 shows another type of non-parallel face sealing segments.

Figure 13 shows a method of reinforcing the flexible housing.

Figure 14 is a perspective view of a reinforcement bonded to the flexible housing.

Figure 15 is a perspective view of a shoe prepared for bonding to the flexible housing.

Figure 16 is a plan view showing a necklace method of attaching the segments to the housing.

Figure 17 is a perspective of a shoe indented for bonding.

Figure 18 is a cross-section of Figure 17.

Referring now to Figure 1 a conventional stuffing-box 1 is shown as forming a part of a machine containing a rod 2, a set of poly-segmental packing rings 3 made according to this invention and held in place by gland 4, fastened and adjusted by bolt 5. Figure 2 shows in cross-section the placement of segments 6 of the rings 3 about the shaft 2.

Figures 3 and 4 show the general construction of my poly-segmental packing ring. A complete ring 3 consists of two main parts, the sealing segment of shoes 6 which are evenly spaced around the rod, and the housing 7 which preferably is of a flexible and elastic material such as rubber. The segments 6 are preferably alike as to thickness, but may be alternately thick and thin, as shown by 6 of Figure 3, or in any similar combination as may be necessary for operation. The segments may be contiguous at the rod surface as at z, or may have a suitable clearance between them to provide adjustment due to wear of the rod. The cross-section Figure 4, shows the segments 6 to have a longitudinal cross-section of right triangular shape, the reasons for which will be explained elsewhere.

The housing 7, perspective view of Figure 5, is moulded of vulcanizable materials such as natural or synthetic rubbers, or compressed into shape of such materials as rock wool or asbestos fibers, or poured into the shape if of plastic or of metals by means shown elsewhere. The housing 7 is a continuous annular ring as indicated by Figure 3, having suitable compartments in which the segments 6 are lodged to hold the latter in alignment and may be cut for springing over a rod when installed, the shoes remaining in their respective compartments while so doing.

Figure 6 is an inside view of the compartment, being a plan view of the housing along line 6 of Figure 5.

The number of segments may be one or more. Figure 10A shows single segment 6 to be an annular ring with a slot cut at S. The housing 7 forms a tongue at the single division point, and at this point the ring may be cut for stringing over the rod. A two segment ring is formed by a second cut at $t$. The 2-segment ring may be cut also at $t$, forming a two piece ring. A three piece poly-segmental ring is shown in Figuse 21A. It should be evident that the construction is adaptable to making multiple segments within segments.

The perspective view of a single shoe 6 is shown in Figure 7. Dimensional relations which cause this packing to be self-setting and to seal under pressure are explained by the diagrammatical outline, Figure 8. The preferred form of the longitudinal cross section is a right triangle, angles $a$ and $b$ being 45 degrees. Then follows that sides X and Y are equal. Wear on the arched surface fitting the rod reduces lengths X and Y equally by the right triangular relation involved. Pressure against the slanting surface of the block 6 is transferred by resolution of forces into thrust T, and then to sealing force R normal to the rod surface. Thrust T in this style of packing may result from a combination of fluid thrust and the elasticity of housing 7 which is under compression of the gland 4.

To automatically maintain continuous contact of the shoes 6 with the rod after wear starts, the shoes preferably are made 45 degrees in cross-section as explained by Figure 8, and assembled in multiple as Figure 9. It will be noted that the housings 7, 7, are situated against the box wall or stationary surfaces $w$, the shoes 6 being in continuous contact tip-to-heel, thruout the length of rod contact $r$. As in Figure 10, after the shoes have been worn smaller to size 6a, the elastic cushion 7 become cushions 7a, with the same volume but changed to quadrilateral shape. The shoes 6a are still tip-to-heel having moved toward the rod $r$, the cushions 7a maintaining their position contiguous to the wall $w$. Lengths X' and Y' are identical and the total packing length is shorter by the volume of the segments lost in wear.

Referring again to Figure 8, angle $a$ may be made greater than 45 degrees in which case, the wear of Figure 10 would show the rubber cushion 7a to take a position 6b and to make contact with the rod which is objectionable, as the cushion would be abrasive. Should angle $a$ of Figure 8 be made less than 45 degrees, the wear of Figure 10 as at 6c would cause the shoes to ride heels against tips, and the cushion 7a would be loose in the space above the shoe, preventing longitudinal adjustment and permitting leakage. It should therefore be obvious that the choice of the 45 degree cross-sectional shape is an automatic means of maintaining a constant exposure of shoes to the inner surface at the same time providing an unchanging elastic reaction within the housing 7, as the packing set becomes shorter.

Viewed endwise, the shoes normally and as preferred, have parallel sides as 6b and 6c of Figure 7. The object of this relation is shown in Figure 11, the dotted lines 6f and 6g being parallel to each other and to the radial line 11a passing thru the center of the shoe. Then as wear occurs in direction $m$, and as has been shown in Figure 10, the longitudinal clearance between the segments at point $z$ is constant. Making the sides non-parallel and diverging outwardly as shown by line 6h and 6j will maintain an approximate clearance if the segments wear and chafe at the joint.

Compensation for rod wear as the segments wear, is obtained by making the blocks non-parallel and diverging inwardly as shown by Figure 12. For rods which are tapered, clearance $z$ is enlarged to permit sufficient contraction of the inner ring diameter.

When used on higher pressures, to prevent the shoes from tipping over as line 13a, Figure 13, and imbedding in the cushion of the adjacent ring, which would alter the original cross-sectional shape by wear, I supply a strongback, or disc 8, which is attached to the cushion 7, and shown in the perspective of Figure 14. Strongback 8 may be of cloth, fiber, or metal, as desired.

When the shoes are made of selected materials, they may be bonded directly to the housing 7 by curing or vulcanization in the assembling process. But when such materials, as synthetic resins, glass, carbon, and so on, are used in the shoes some mechanical bond must be supplied to keep the shoes in the housing during shipment and while installing. It should be obvious that when once assembled around a rod, the shoes cannot be forced out of place, either by friction or pressure thrust.

For those materials such as resins, carbon, and wood which can be drilled, Figure 15 shows one method of providing a bond by drilling hole 9. When assembled in a mould, the housing material will flow into the holes and form a bond across the segment. Or the shoes are strung on a cord or wire 16, Figure 16, and will then be imbedded in the housing 7 during vulcanization. Materials such as glass or porcelain may be indented as 10, Figures 17, 18.

The distribution of thrust and sealing pressures when practicing my invention are diagrammed in Fig. 8, and by virtue of such distribution of forces any combination of pressure levels may be sealed by my poly-segmental packing rings. It should be understood however that the rings may be used in a reverse position and still seal, but at a loss of frictional efficiency.

The housing 7 of Figure 5, for temperatures less than 250 degrees Fahrenheit, is best made of natural or synthetic rubbers, in pure state or combined with fibers to give strength. For higher temperatures plastic combinations or a mass of asbestos fibers may be used. Soft metals such as lead and its alloys may also be formed arond the shoes to meet some conditions.

The materials available for the shoes include practically anything in nature which gives lower frictional values. Synthetic compositions which are strong enough to resist given pressures and which have a moderate friction of contact are equally usable. For water, either pure or containing abrasives in suspension, I prefer wood. The iron woods such as American locust or South American lignum vitae contain a high percentage of natural pitch and rosin, are extremely resistant to abrasives and shed water with a minimum of warpage.

Segments may be made of porous materials, such as cork, compressed asbestos fibers, ramie, cotton and the like. When coated or impregnated with suitable cement such as rubber cut with gasoline, this class of material may be directly bonded to the housing 7 of Figure 3.

For chemical solutions having little sediment such as caustic soda and dilute acids which produce a high friction against fibers of all kinds, bonded carbon shoes give excellent results, oftentimes lowering the friction as much as 75 percent, and reducing the shaft wear considerably.

Strong acids and alkalies may be satisfactorily sealed with glass or porcelain shoes set in suitable housings.

Dry gases such as air, natural gas, carbonic acid gas and the like, when forced oil lubrication is available, may be handled by shoes made of bronze, cast iron or alloyed non-ferrous metals.

Gasolines and oils are suitably sealed by laminated segments of cotton or asbestos cloth and phenol-formaldehyde condensation vulcanized under pressure with heat. For the housing of this combination I prefer Du Pont's Neoprene properly prepared and ready for vulcanization.

The variations of pressure, temperature, and friction met in commercial practice handling liquids, gases, and vapours can be satisfactorily sealed on all motions such as reciprocation and rotation, by some available choice of materials for the segments and a suitable design of this invention.

Thus one of the chief advantages of my invention is the capability of the segments to follow the rod when vibration occurs. Referring to Figure 3, the segments in practice do not meet the wall surface, but are cut short as indicated by 6''. This causes a cushion to exist between the segment and the stationary wall surface, in which the segment may momentarily be imbedded due to rod movement, whether of low or high pitched vibration. This feature makes the packing specially suitable for rotating shaft work, the segments following the geometrical center of the shaft as it vibrates.

Manifestly, I have shown in the drawing and explained but a few of the details and mechanical arrangement of poly-segmental design. The principal ideas of compensation for wear without appreciably changing the relation of the parts, and the maintenance of a substantially constant tension within the packing structure during operation and wear are valuable features of this invention. The ideas may also be adapted to radial thrust rings, to pistons, and in other special designs.

Considering the foregoing, I do now claim:

1. A rectangular packing ring for a rod passing through a stuffing box, said ring comprising a plurality of right triangular sections arranged about a common axis and each having the base thereof arcuately longitudinally contoured, said contoured bases lying in a common cylindrical surface about said axis, the longitudinal side faces of said sections lying in spaced substantially parallel planes and the adjacent edges of successive sections being closely juxtaposed so that the contoured bases form a segmented cylindrical surface, and a housing of resilient material engaging the hypotenuse and side faces of said sections and having a peripheral surface adapted to engage the inner surface of the stuffing box.

2. A rectangular packing ring for a rod passing through a stuffing box, said ring comprising a plurality of right triangular sections arranged about a common axis and each having the base thereof arcuately longitudinally contoured, said contoured bases lying in a common cylindrical surface about said axis, the longitudinal side faces of said sections lying in spaced substantially parallel planes and the adjacent edges of successive sections being closely juxtaposed so that the contoured bases form a segmented cylindrical surface, a housing of resilient material engaging the hypotenuse and side faces of said sections and having a peripheral surface adapted to engage the inner surface of the stuffing box and a support member on the axial face of said housing adapted to engage the axial faces of the sections of an adjacent ring to prevent tipping of such sections.

HARLEY T. WHEELER.